April 29, 1930. H. CLEVENGER 1,756,536
MILK COOLING DEVICE
Filed Dec. 8, 1927
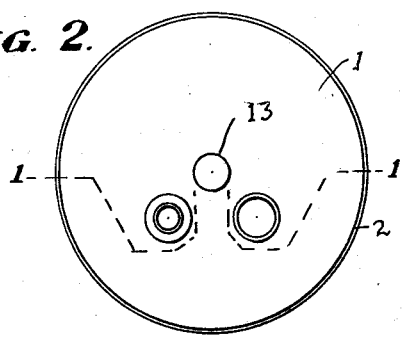
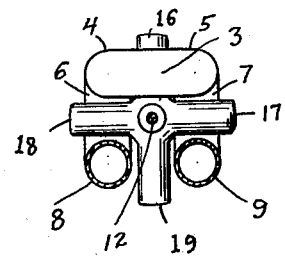
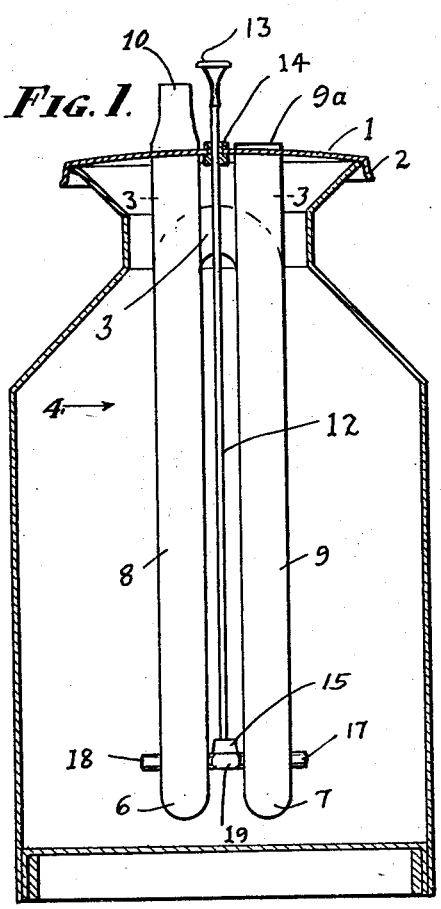
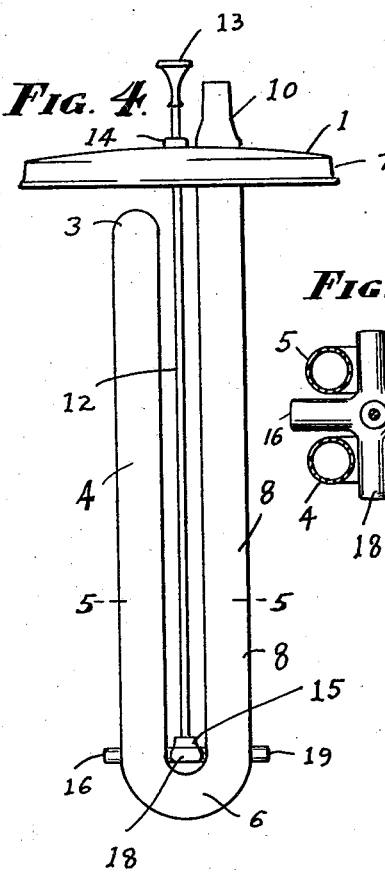
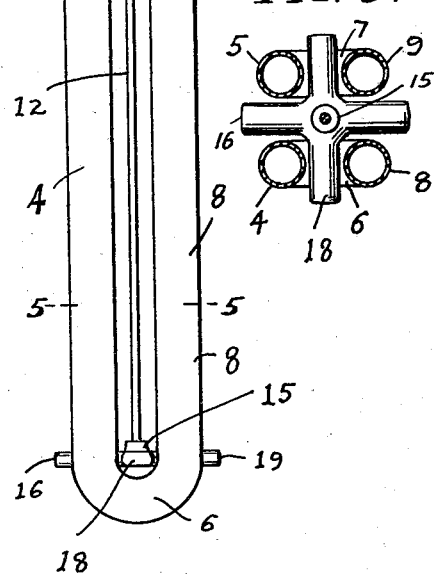
INVENTOR
HERMAN CLEVENGER
Thomas L. Ryan
ATTORNEY.

Patented Apr. 29, 1930

1,756,536

UNITED STATES PATENT OFFICE

HERMAN CLEVENGER, OF MONROE TOWNSHIP, DELAWARE COUNTY, INDIANA

MILK-COOLING DEVICE

Application filed December 8, 1927. Serial No. 238,630.

This invention relates to improvements in devices for the lowering of the temperature of liquids, and has especial reference to devices of this character intended for the cooling of milk. In the industry of the transporting and distributing of quantities of milk, it is desirable that the milk before being delivered into the transport cans in which it is contained for distribution, may be lowered in temperature to that degree desirable for the best preservation of the milk in pure condition.

I am aware that methods and mechanical devices have heretofore been devised and practiced whereby the milk as coming from its source of supply, is subjected to cooling and is rehandled in sanitary rooms and by sanitary devices provided therefor, the milk that is so rehandled and cooled being rendered suitable for delivery eventually into suitable transport containers. To overcome the disadvantages incident to rehandling, and to facilitate the work of getting the milk from the source of supply into the transport cans in proper condition, the object of the present invention is to provide a device whereby the milk, as received in the container, from the source of supply, may be quickly lowered in temperature to that degree required and necessary for its best preservation.

While the invention is capable of being adapted to containers of various capacities and sizes, it is especially adapted for, and in this specification, it is shown as suitably applicable to use in connection with a milk transport can of standard form and size.

More specific purposes of my invention are to provide a device of the kind described, which will be of simple and economical constructon, light in weight, strong and durable, capable of being easily cleansed; and which is easy to operate and which is not liable to get out of order or repair.

The objects of my invention are accomplished by, and the invention is embodied in the new construction, combination and arrangement of parts shown in the accompanying drawings and described in the following specification. The inventon is defined in the appended claims.

The several parts of the invention, as they appear in the different views in the drawings, are identified by suitable characters of reference applied to them.

In the drawings,—

Figure 1 is a side view of my improved milk cooler device, disposed in connection with a milk container of standard type, the support plate being shown in section on line 1—1 in Figure 2.

Figure 2 is a top plan view of Figure 1, the milk container being not shown.

Figure 3 is a sectional plan view taken on the line 3—3 in Figure 1.

Figure 4 is a side view of the invention, taken in the direction of the arrow 4 in Figure 1.

Figure 5 is a sectional plan view taken on the line 5—5 in Figure 4.

A transport can of the type referred to, is cylindrical in plan, and is constructed of relatively heavy gauge sheet metal, being about thirteen inches in diameter, and about twenty three inches in height, the rim or mouth being about nine inches in diameter:

My invention, as shown in the present embodiment, and as illustrated in the drawings, comprises a support plate 1 which is of formation and size to constitute a closure cap for a transport can of the type shown in Figure 1. This element 1 which may be designated as a closure plate, is circular in plan and of slightly convexed formation in cross section, and has the annular lip or flange 2 which is adapted to rest in engagement with the rim of the mouth of the container.

In combination with this support plate, is provided a circulatory conduit, its ends being adapted to protrude through the said plate 1, and its body portion being adapted to occupy a position inside the container when the closure plate is in place. This conduit may be practicably formed of tinned metal piping about one and one quarter inches in diameter, its bends being provided for by fittings properly welded or soldered. Or, it may be formed of seamless tubing, this last named material being preferred. For the construction of this conduit, a quota of tubing of the proper predetermined length is provided. At its central portion it is fashioned in return bend 3 formation, the adjacent body portions 4 and 5 of the tubing being extended in parallelism spaced apart about one inch, thence by return bends 6 and 7 respectively (each of which said bends is at a right angle to the bend 3) being extended in parallelism, spaced apart from each other about one inch, and from the body portions 4 and 5 a similar distance, and constituting the body portions 8 and 9. The ends of these body portions 8 and 9 are passed through suitable openings provided therefor in the closure plate 1, and are there hermetically secured.

The end of the body portion 8 of the conduit is fitted with, or drawn into the form of a tapered nozzle 10, and to which nozzle a hose pipe (not shown) from a source of cold water supply, may be readily attached. The end of the body portion 9 of the conduit is terminated flush, or slightly above the upper surface of the closure plate 1, as shown in Figure 1.

Adapted to be operated reciprocatively between the opposed faces of the body portions of the circulatory conduit, is a stirrer, the function of which is to stir or mildly agitate the milk contents of the container, while cold water is being passed through the conduit. This stirrer consists of a slender rod 12 of the suitable length shown, provided with a handle 13, and which rod is passed through a bearing bushing 14 provided therefor in the closure plate 1. Secured on the lower end of rod 12 is a head member 15 which is preferably made of aluminum or other light metal. Integrally formed similar arms 16, 17, 18 and 19 which extend at right angles from said head member, are of flat formation in cross section, their corners being rounded. These arms are of width to freely occupy positions between the body portions of the conduit, the same constituting guideways by which the stirrer may be readily and easily reciprocated by the operator.

A milk cooler constructed in accordance with my invention is extremely economical of construction, and may be sold at a relatively low price. It is light in weight and easy to be disposed in or removed from operative position. When not in use it may be supported in out of the way position by a suitable wall support to be engaged by the lip of the closure plate 1. By the peculiar and novel combination and arrangement of the body portions of the conduit, there is provided a circulatory tract of such conformation and area, that the liquid content of the can is readily caused to be affected by the low temperature of the conduit. The body portions of the conduit also constitute guideways for the stirrer head member, the device in its entirety being simple and strong of construction, and not liable to get out of order or repair. In addition to the cooling effect of the cold water passing through the vertical and transverse areas of the conduit, there is the effect of the cold water passing from the mouth 9ª of the conduit and flowing down the exterior surfaces of the walls of the can.

While the present description of the invention relates to its use as intended for the cooling of milk, it is obvious that the device is effective with liquids of other character. Also it will be understood that minor changes may be made in the structural features and details of the invention, within the scope of same as defined in the appended claims, without departing from the spirit of the invention or sacrificing any of its advantages.

What I claim as my invention, and desire to secure by Letters Patent, is—

1. A cooler device of the kind described, comprising a support member adapted to constitute a closure of the opening in the container, a circulatory conduit having a return bend therein and whose adjacent body portions are extended in parallelism and spaced apart, thence by return bends that are directed at a right angle to the first named bend, being extended in parallelism and spaced apart from each other and from the first named body portions, and through and being secured to said support member, and a reciprocatory stirrer having transverse arms operable between the opposed faces of the body portions of the said conduit.

2. In a device of the kind described, the combination with a flanged closure plate adapted to be removably disposed on the opening of a container can, of a circulatory conduit having a return bend therein and whose adjacent body portions are extended in parallelism and spaced apart, thence by return bends that are directed at a right angle to the first named bend, being extended is parallelism and spaced apart from each other and from the first named body portions, and through and being secured in sealed engagement with said support plate, and a reciprocatory stirrer operable between the opposed faces of the body portions of said conduit.

HERMAN CLEVENGER.